(12) United States Patent　(10) Patent No.: US 7,225,601 B2
Spatafora　(45) Date of Patent: Jun. 5, 2007

(54) MULTIPURPOSE CARTONING MACHINE

(75) Inventor: Mario Spatafora, Granarolo (IT)

(73) Assignee: G.D. Societa' per Azioni, Bologna (IT)

( * ) Notice: Subject to any disclaimer, the term of this patent is extended or adjusted under 35 U.S.C. 154(b) by 0 days.

(21) Appl. No.: 11/416,045

(22) Filed: May 2, 2006

(65) Prior Publication Data

US 2006/0272298 A1　Dec. 7, 2006

(30) Foreign Application Priority Data

May 3, 2005　(IT)　.......................... BO2005A0309

(51) Int. Cl.
　　*B65B 35/30*　(2006.01)
　　*B65B 1/30*　(2006.01)
(52) U.S. Cl. .............................. 53/542; 53/501; 53/543
(58) Field of Classification Search .................. 53/147, 53/148, 152, 500, 501, 531, 537, 540, 542, 53/543; 198/406, 407
See application file for complete search history.

(56) References Cited

U.S. PATENT DOCUMENTS

| | | | | |
|---|---|---|---|---|
| 2,277,408 | A * | 3/1942 | Molins | ........................ 53/540 |
| 3,032,211 | A * | 5/1962 | Wordsworth | ................ 198/406 |
| 4,265,073 | A * | 5/1981 | Seragnoli | ..................... 53/542 |
| 4,352,264 | A * | 10/1982 | Seragnoli | ..................... 53/531 |
| 4,505,093 | A * | 3/1985 | Johnson | ........................ 53/531 |
| 4,597,246 | A * | 7/1986 | Mattei et al. | ................. 53/542 |
| 4,680,919 | A * | 7/1987 | Hirama et al. | ................ 53/531 |
| 4,932,190 | A * | 6/1990 | Bergner et al. | ............... 53/531 |
| 6,006,892 | A * | 12/1999 | Francioni | ..................... 53/537 |
| 6,684,611 | B2 * | 2/2004 | Cassoli | ........................ 53/537 |
| 6,990,783 | B2 * | 1/2006 | Spatafora et al. | ............. 53/148 |
| 2005/0000188 | A1 | 1/2005 | Spatafora et al. | |
| 2006/0272298 | A1 | 12/2006 | Spatafora | |

FOREIGN PATENT DOCUMENTS

| | | |
|---|---|---|
| EP | 0 860 384 | 8/1998 |
| EP | 0 894 750 | 2/1999 |
| EP | 1 452 452 | 9/2004 |

* cited by examiner

*Primary Examiner*—Louis Huynh
(74) *Attorney, Agent, or Firm*—McCarter & English LLP

(57) ABSTRACT

A multipurpose cartoning machine for packets of cigarettes, having a packet conveying assembly wherein a first conveyor feeds single packets, arranged in an orderly succession on edge, to an accumulating station for forming subgroups of packets placed flat one on top of the other, and a second conveyor is associated with the first conveyor to receive the packets conveyed by the first conveyor and to feed the packets to a packing device; the conveying assembly assuming a first configuration wherein the second conveyor is connected to the first conveyor at the accumulating station to receive, from the first conveyor, a succession of subgroups of packets laid flat, and a second configuration wherein the second conveyor is connected to the first conveyor upstream from the accumulating station to receive an orderly succession of single packets positioned on edge.

18 Claims, 3 Drawing Sheets

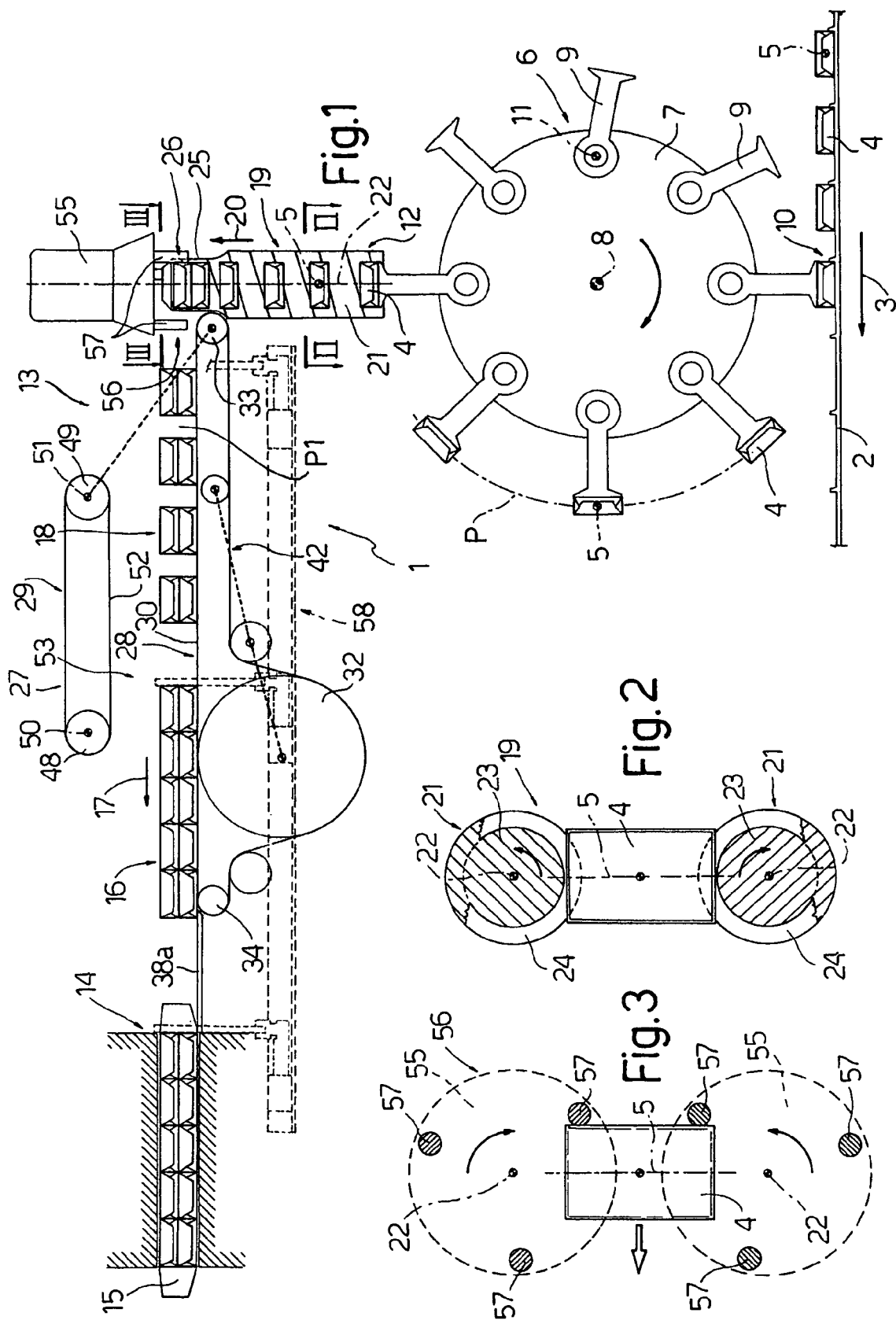

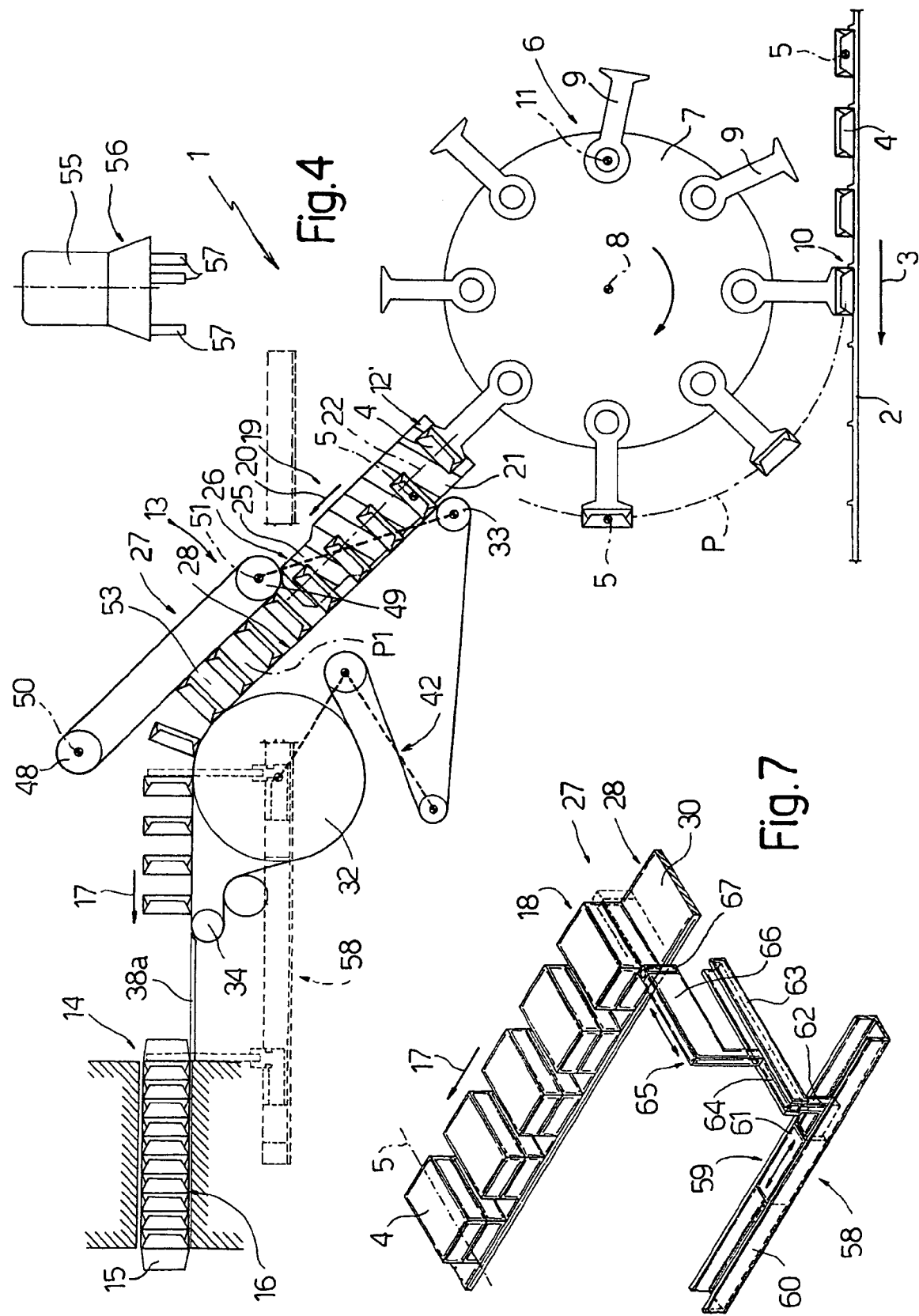

MULTIPURPOSE CARTONING MACHINE

The present invention relates to a multipurpose cartoning machine for packets of cigarettes.

BACKGROUND OF THE INVENTION

In the tobacco industry, rectangular parallelepiped-shaped cartons of packets of cigarettes are produced, in which the packets, normally ten in number, are arranged in a number of groups, normally five, arranged side by side along a longitudinal axis of the carton, and each of which comprises at least two packets placed flat one on top of the other, i.e. with their major lateral surfaces parallel to said longitudinal axis.

Alternatively, rectangular parallelepiped-shaped cartons of packets of cigarettes are produced, in which the packets, normally ten in number, are arranged side by side along a longitudinal axis of the carton and on edge, i.e. with their major lateral surfaces perpendicular to said longitudinal axis.

Each of the above two types of carton is produced on a specific type of cartoning machine.

SUMMARY OF THE INVENTION

It is an object of the present invention to provide a cartoning machine for selectively producing both the above types of carton.

According to the present invention, there is provided a cartoning machine as claimed in the attached Claims.

BRIEF DESCRIPTION OF THE DRAWINGS

A non-limiting embodiment of the present invention will be described by way of example with reference to the accompanying drawings, in which:

FIG. 1 shows a schematic side view of a preferred embodiment of the cartoning machine according to the present invention in a first operating configuration;

FIG. 2 shows a section along line II—II in FIG. 1;

FIG. 3 shows a section along line III—III of the FIG. 1 cartoning machine in a different operating position;

FIG. 4 shows a schematic side view of the FIG. 1 cartoning machine in a second operating configuration;

FIG. 7 shows a larger-scale view in perspective of a second detail of FIGS. 1 and 4.

DETAILED DESCRIPTION OF THE INVENTION

Figure 5:
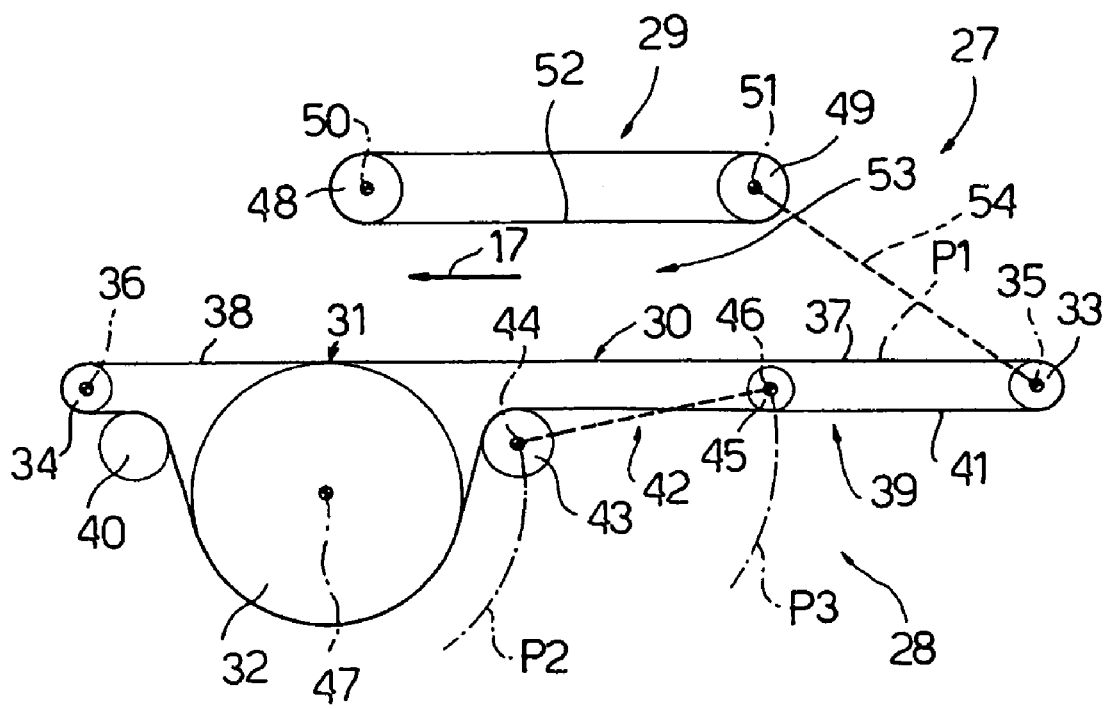
FIGS. 5 and 6 show a larger-scale first detail of FIGS. 1 and 4 in the FIGS. 1 and 4 configurations respectively.
Figure 6:
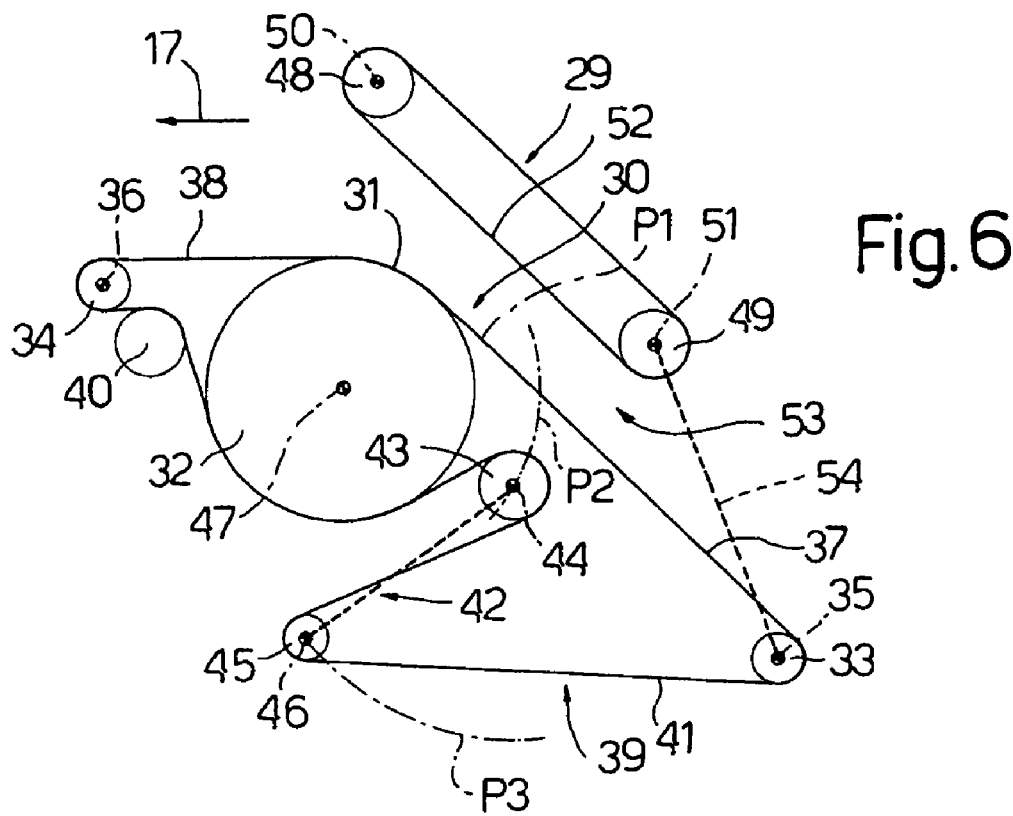

Number 1 in FIGS. 1 and 4 indicates as a whole a cartoning machine comprising an input conveyor 2 for feeding in a direction 3 an orderly succession of packets 4 of cigarettes, each of which is substantially rectangular parallelepiped-shaped and positioned flat on input conveyor 2, i.e. with its major lateral surfaces parallel to direction 3. In the example shown, each packet 4 is also positioned on input conveyor 2 with its longitudinal axis 5 crosswise to direction 3.

Cartoning machine 1 also comprises a known transfer wheel 6, in turn comprising a central hub 7 rotating continuously about an axis 8 parallel to longitudinal axes 5 and crosswise to direction 3; and a number of known gripping heads 9 connected to central hub 7 and equally spaced about axis 8. Each gripping head 9 is moved by central hub 7 along a circular path P substantially tangent to input conveyor 2 at a pickup station 10, and is hinged to the periphery of central hub 7 to oscillate, in known manner and with respect to central hub 7, about a respective axis 11 parallel to axis 8, to grip a respective packet 4 at pickup station 10 in known manner and preferably by suction. Each gripping head 9 moves with central hub 7 about axis 8 to feed respective packet 4 along path P and to an input station 12 of a conveying assembly 13 interposed between transfer wheel 6 and a known packing device 14, which is supplied by conveying assembly 13 with a succession of blanks 15, and with a succession of groups 16, each of which is packed in known manner in a respective blank 15 to form a respective carton (not shown) and comprises a given number of—normally ten—packets 4 arranged in a desired manner.

In the FIG. 1 example, each group 16 comprises a number of—in the example shown, five—side by side subgroups 18, each defined by two packets 4 placed flat one on top of the other and positioned flat with their respective longitudinal axes 5 perpendicular to a feed direction 17 to packing device 14.

In the FIG. 4 example, on the other hand, each group 16 comprises a number of—in the example shown, ten—packets 4 arranged side by side on edge, i.e. with their respective longitudinal axes 5 and major lateral surfaces perpendicular to feed direction 17.

As shown in FIGS. 1 and 4, conveying assembly 13 comprises a screw conveyor 19, which receives packets 4 successively at input station 12 and feeds them in an orderly succession in a radial direction 20 with respect to axis 8. The packets are fed along screw conveyor 19 on edge, i.e. with their respective longitudinal axes 5 and major lateral surfaces perpendicular to direction 20.

Screw conveyor 19 is fitted to a frame (not shown) hinged about axis 8, and which rotates about axis 8 to move screw conveyor 19 about axis 8 between a vertical position (FIG. 1) wherein input station 12 is located diametrically opposite pickup station 10 with respect to transfer wheel 6, and a tilted position (FIG. 4) wherein input station 12, indicated 12' in FIG. 4, is shifted, with respect to the vertical position and about axis 8 towards packing device 14, by an angle equal to the angle between two adjacent axes 11.

With reference to FIG. 2, screw conveyor 19 comprises two screws 21 rotating in opposite directions about respective parallel axes 22 lying in the same plane through axis 8. Screws 21 are located on opposite sides of path P and have respective cores 23, which are separated by a distance at least equal to the length of a packet 4, have respective threads 24, and have respective input portions which together define input station 12. At the opposite end to input station 12, each screw 21 has a threadless end portion 25, which, together with end portion 25 of the other screw 21, defines an accumulating station 26.

As shown in FIG. 1, conveying assembly 13 also comprises a belt conveyor 27 interposed between screw conveyor 19 and packing device 14, and defined by two conveyors 28 and 29—of which, conveyor 29 is an idle conveyor—located on opposite sides of a path P1 along which packets 4 are fed along belt conveyor 27. Conveyor 28 is a powered endless conveyor having a conveying branch 30, which comprises an intermediate portion 31 extending in contact with the outer periphery of a drive pulley 32 located on the opposite side of conveying branch 30 to conveyor 29. Conveying branch 30 extends between two guide pulleys 33 and 34; guide pulley 33 rotates about an axis 35 parallel to axis 8, and is located adjacent to screw conveyor 19; and guide pulley 34 rotates about an axis 36 parallel to axis 8, and is located adjacent to packing device 14. Drive pulley 32 defines, along conveying branch 30, an input portion 37 extending between guide pulley 33 and intermediate portion 31; and an output portion 38 extending between intermediate portion 31 and guide pulley 34 and connected to packing device 14 by a fixed plate 38a.

Conveyor 28 also comprises a return branch 39, which in turn comprises an intermediate portion extending a given angle about drive pulley 32; an input portion extending between guide pulley 34 and drive pulley 32, and about a guide pulley 40 located on the opposite side of return branch 39 to conveying branch 30; and an output portion 41 extending between drive pulley 32 and guide pulley 33, and about a tensioning device 42.

Tensioning device 42 is defined by a pulley 43 located on the opposite side of return branch 39 to conveying branch 30, and rotating about an axis 44 parallel to axis 8 and movable transversely along a path P2 in opposition to elastic means not shown; and by a pulley 45 interposed between conveying branch 30 and return branch 39, and rotating about an axis 46 movable transversely along a path P3 in opposition to elastic means not shown. More specifically, path P2 is a substantially circular path extending about an axis of rotation 47, parallel to axis 8, of drive pulley 32; and path P3 is a circular path extending about axis 44 and movable with axis 44 about axis 47.

Conveyor 29 is located above conveyor 28, and is an endless conveyor comprising two guide pulleys 48 and 49; guide pulley 48 rotates about an axis 50 parallel to axis 8, and is located adjacent to packing device 14; and guide pulley 49 rotates about an axis 51 parallel to axis 8, and is located adjacent to screw conveyor 19. Conveyor 29 comprises a conveying branch 52 extending between guide pulleys 48 and 49 and positioned facing and parallel to input portion 37 of conveying branch 30 to define, with input portion 37, a channel 53 for feeding packets 4 towards packing device 14 and along path P1.

In belt conveyor 27, axes 36, 47 and 50 are fixed; axes 44 and 46, as stated, are movable transversely, in opposition to elastic means not shown, along path P2 and path P3 respectively; and axes 35 and 51 are connected to each other by a connecting rod 54, and are movable, about axis 50 and by an actuating device not shown, between a raised position (FIG. 1)—in which, input portion 37 and output portion 38 of conveying branch 30 are aligned horizontally with each other and parallel to conveying branch 52, and guide pulley 33 is located at accumulating station 26 in the position assumed when screw conveyor 19 is in the vertical position—and a tilted position (FIG. 4)—in which, conveying branch 52 and input portion 37 of conveying branch 30 are parallel to the feed direction 20 of packets 4 along screw conveyor 19, and on opposite sides of the feed path of packets 4 along screw conveyor 19 when screw conveyor 19 is in the tilted position (FIG. 4).

For this purpose, the angle by which screw conveyor 19 oscillates about axis 8 is complementary to the angle by which conveying branch 52 oscillates about axis 50.

When conveying branch 52 and input portion 37 of conveying branch 30 are in the tilted position, the height of channel 53 is reduced to substantially equal the width of packets 4 which, travelling in an orderly succession on edge along screw conveyor 19, engage conveying branch 30 on edge and channel 53 before reaching accumulating station 26.

In connection with the above, it should be pointed out that, when input portion 37 of conveying branch 30 is in the tilted position (FIG. 4), pulley 33 is located—as a result of both pulley 33 translating transversely about axis 50, and conveying branch 30 winding partly about drive pulley 32—at a distance from the outer periphery of central hub 7 greater than the length of a gripping head 9 carrying respective packet 4, so as not to interfere with path P.

Conveyor 29 and input portion 37 of conveying branch 30 may obviously be oscillated jointly about an axis other than axis 50, e.g. axis 47. In which case, the only precaution necessary is to prevent guide pulley 33, when input portion 37 is in the tilted position, from interfering with the path P of packets 4 about axis 8. This can be achieved (as in a variation not shown) by mounting guide pulley 33 on a slide movable parallel to input portion 37, and moving the slide towards drive pulley 32 as input portion 37 moves into the tilted position.

When screw conveyor 19 is in the vertical position, each screw 21 is positioned coaxial with a respective housing 55 of a rotary push device 56 for feeding, as explained in detail below, an orderly succession of subgroups 18 from accumulating station 26 to input portion 37 of conveyor 28 of belt conveyor 27. For this purpose, housings 55 rotate in opposite directions, and each comprise, on the side facing respective screw 21, a respective number of peripheral axial pins 57 equally spaced about relative axis 22 and projecting from housing 55 towards accumulating station 26. Each pin 57 moves through accumulating station 26 in time with a relative pin 57 on the other housing 55 to transfer subgroups 18 successively from accumulating station 26 to belt conveyor 27.

On cartoning machine 1, transfer of packets 4 from belt conveyor 27 to packing device 14 along plate 38a is controlled by a push device 58 comprising a linear electric motor 59, in turn comprising a stator, which is defined by a rail 60 extending parallel to output portion 38 of conveying branch 30 and located below output portion 38 and plate 38a and to the side of belt conveyor 27; and a movable assembly 61 mounted to slide along rail 60.

Movable assembly 61 comprises an upright 62; and a rail 63 integral with the top of upright 62, extending crosswise to direction 17, and along which runs a slide 64 of a powered L-shaped pusher 65 comprising a paddle 66. As slide 64 moves along rail 63, paddle 66 is moved between a withdrawn position of non-interference and a forward position of interference with path P1 along which packets 4 are fed in feed direction 17 to packing device 14.

In a variation not shown, paddle 66 is hinged to the top of upright 62 to rotate between said withdrawn and forward positions about an axis parallel to feed direction 17.

Paddle 66 is fitted with a detect-and-count device 67, which moves with movable assembly 61 to count the packets 4 or subgroups 18 of packets 4 moving past paddle 66 when paddle 66 is in the withdrawn position and travelling along rail 60 in the opposite direction to feed direction 17.

To produce cartons (not shown) comprising groups 16 of side by side subgroups 18, cartoning machine 1 is set to the FIG. 1 configuration, i.e. with screw conveyor 19 positioned vertically, with conveying branch 30 of conveyor 28 positioned horizontally with guide pulley 33 located at accumulating station 26, and with conveyor 29 in the raised horizontal position defining, with conveying branch 30, a channel 53 of a height greater than that of subgroups 18.

In the above configuration of cartoning machine 1, packets 4 are picked up successively by transfer wheel 6 off input conveyor 2 at pickup station 10, and are transferred successively to screw conveyor 19 at input station 12.

The packets are then fed successively by screws 21 in direction 20 to accumulating station 26 where they are stacked. When the desired number of packets 4—two in the example shown—are stacked at accumulating station 26, housings 55 of rotary push device 56 are moved forward one step to transfer a subgroup 18 from accumulating station 26 to input portion 37 of conveying branch 30 of conveyor 28. A continuous succession of subgroups 18 is thus formed on conveying branch 30 of conveyor 28, and is fed in direction 17 past pusher 65 in the withdrawn position. When detect-and-count device 67 detects the passage of a sufficient number of subgroups 18—five in the example shown—to form a group 16, pusher 65 moves into the forward position, and linear electric motor 59 is operated to move paddle 66 along conveying branch 30 towards packing device 14 faster than the travelling speed of conveying branch 30, so as to compact subgroups 18 into a group 16, which is fed by push device 58 directly into packing device 14.

Pusher 65 is then restored to the withdrawn position, and linear electric motor 59 is inverted to move pusher 65 back in the opposite direction to feed direction 17. As it moves back, pusher 65 travels past the incoming subgroups 18, and, upon detect-and-count device 67 counting a number of subgroups 18 equal to the number in group 16, moves back into the forward position, and linear motor 59 is again inverted to compact and feed another group 16 to packing device 14.

Push device 58 is therefore highly flexible, by its operating range being easily adjustable by adjusting the start point, and by the length of its travel being self-adjustable as a function of the feedthrough rate of subgroups 18. Moreover, since the return travel of movable assembly 61 only terminates upon detect-and-count device 67 "sweeping" the set number of subgroups 18 in assembly 16, push device 58 also provides for compensating any gaps (one or more missing subgroups 18) along conveying branch 30.

Finally, since the return travel is performed without cutting off supply of packets 4 in feed direction 17, operation of push device 58 involves no downtime.

To produce cartons (not shown) comprising groups 16 of a given number of side by side packets 4 on edge, cartoning machine 1 is set to the FIG. 4 configuration, i.e. with screw conveyor 19 in the tilted position, with input portion 37 of conveying branch 30 of conveyor 28 tilted and extending partly along the path travelled by packets 4 as they are fed by conveyor 19 in direction 20, and with guide pulley 33 located outwards of transfer wheel 6 and close to input station 12'. At the same time, conveyor 29 is set to the tilted position to define, with input portion 37, a channel 53 of a height, as stated, substantially equal to, but preferably slightly less than, the width of packets 4. In a variation, the height of channel 53 is slightly more than the width of packets 4, and conveyor 29 has a number of equally spaced projections (not shown) which, along conveying branch 52, cooperate with conveying branch 30 to feed packets 4, equally spaced, along channel 53.

In both cases, packets 4 engage belt conveyor 27 upstream from accumulating station 26, and are therefore kept separate and transferred on edge from screw conveyor 19 to belt conveyor 27. Output portion 38 of conveyor 28 is thus fed with an orderly succession of equally spaced packets 4, which are compacted by push device 58 in the same way as subgroups 18 described above.

It should be pointed out that, in the FIG. 4 configuration, the operating range of push device 58 is restricted to output portion 38 and plate 38a, as opposed to the whole length of conveying branch 30 and plate 38a, as in the FIG. 1 configuration of cartoning machine 1. However, since linear electric motor 59 provides for easily adjusting the movement of movable assembly 61, and therefore the extent and location of the operation range of push device 58, the reduction in the operating range of push device 58 caused by tilting input portion 37 poses no problem.

The invention claimed is:

1. A multipurpose cartoning machine for packets of cigarettes, comprising a packing device (14) and a conveying assembly (13) for feeding the packets (4) to the packing device (14); wherein the conveying assembly (13) comprises a first and a second conveyor (19, 27), and the first conveyor (19) comprises, at a respective output end, an accumulating station (26) for forming subgroups (18) of packets (4) placed flat one on top of the other; and wherein the first conveyor (19) feeds single packets (4), in an orderly succession and positioned on edge, to the accumulating station (26), and the second conveyor (27) is associated with the first conveyor (19) to receive the packets (4) conveyed by the first conveyor (19), and to feed the packets (4) to the packing device (14); the conveying assembly (13) selectively assuming a first configuration, wherein the second conveyor (27) is connected to the first conveyor (19) at the accumulating station (26) to receive, from the first conveyor (19), a succession of subgroups (18) of packets (4) laid flat; and a second configuration, wherein the second conveyor (27) is connected to the first conveyor (19) upstream from the accumulating station (26) to receive an orderly succession of single packets (4) positioned on edge.

2. A cartoning machine as claimed in claim 1, wherein, when the conveying assembly (13) is in the first configuration, the first and second conveyor (19, 27) are perpendicular to each other, and an input of the second conveyor (27) is connected to the first conveyor (19) at the accumulating station (26).

3. A cartoning machine as claimed in claim 1, wherein the first conveyor (19) is mounted to oscillate, about a first axis (8), between a first position assumed when the conveying assembly (13) is in the first configuration, and a second position tilted with respect to the first position by a given first angle and assumed when the conveying assembly (13) is in the second configuration.

4. A cartoning machine as claimed in claim 3, wherein said first and said second angle are complementary to each other, and the second conveyor (27) extends partly along the first conveyor (19) when the conveying assembly (13) is in the second configuration.

5. A cartoning machine as claimed in claim 3, and comprising a transfer wheel (6) for transferring an orderly succession of packets (4) to an input of the first conveyor (19); the transfer wheel (6) being mounted to rotate about the first axis (8).

6. A cartoning machine as claimed in claim 1, wherein the second conveyor (27) is mounted to oscillate, about a second axis (50), between a first position assumed when the conveying assembly (13) is in the first configuration, and a second position tilted with respect to the first position by a given second angle and assumed when the conveying assembly (13) is in the second configuration.

7. A cartoning machine as claimed in claim 6, wherein the second conveyor (27), when set to its first position, is a straight conveyor.

8. A cartoning machine as claimed in claim 1, wherein the first conveyor (19) is a screw conveyor.

9. A cartoning machine as claimed in claim 1, wherein the first conveyor (19) comprises two counter-rotating screws (21) having respective parallel axes (22) of rotation; each screw (21) comprising a respective axial core (23) and a respective thread (24) coiling about the respective core (23), an output end portion of which is threadless to define, with the other core (23), the accumulating station (26).

10. A cartoning machine as claimed in claim 1, wherein the second conveyor (27) is a belt conveyor (27).

11. A cartoning machine as claimed in claim 1, wherein the second conveyor (27) comprises a first and a second belt conveyor (28, 29), and wherein the first belt conveyor (28) comprises an input portion (37) and an output portion (38), and the second belt conveyor (29) faces the input portion (37) of the first belt conveyor (28) to define, with the input portion (37) of the first belt conveyor (28), a conveying channel (53) for the packets (4); the second belt conveyor (29) and the input portion (37) of the first belt conveyor (28) being mounted to oscillate jointly about a common axis (50) of oscillation, while remaining parallel to each other, so as to selectively assume respective first and second positions about the axis (50) of oscillation.

12. A cartoning machine as claimed in claim 11, wherein, when the input portion (37) of the first belt conveyor (28) is in the respective first position, the conveying channel (53) is of a height greater than the height of said subgroups (18) of packets (4).

13. A cartoning machine as claimed in claim 11, wherein, when the input portion (37) of the first belt conveyor (28) is in the respective second position, the conveying channel (53) is of a height substantially equal to the width of the packets (4).

14. A cartoning machine as claimed in claim 1, and comprising detect-and-count means (67) for detecting and counting the packets (4) or subgroups (18) of packets (4) travelling along the second conveyor (27); and push means (58) controlled by the detect-and-count means (67) and movable along the second conveyor (27) to perform a succession of back and forth operating cycles, and to transfer a group (16) of a given number of packets (4) from the second conveyor (27) to the packing device (14) at each operating cycle.

15. A cartoning machine as claimed in claim 14, wherein the detect-and-count means (67) are movable along the second conveyor (27) together with the push means (58).

16. A cartoning machine as claimed in claim 15, wherein the detect-and-count means (67) are carried by the movable assembly (61).

17. A cartoning machine as claimed in claim 14, wherein the push means (58) comprise a linear electric motor (59) and a push member (65); and wherein the linear electric motor (59) comprises a stator (60) extending along at least part of the second conveyor (27), and a movable assembly (61) fitted in sliding manner to the stator (60); the push member (65) being carried by the movable assembly (61).

18. A cartoning machine as claimed in claim 16, wherein the push member (65) is a powered member movable, with respect to the movable assembly (61) and under the control of said detect-and-count means (67), between a position of interference and a position of non-interference with a path (P1) along which the packets (4) are fed along the second conveyor (27).

* * * * *